INVENTORS.
Ralph S. Zebarth
Reed J. Wight
BY John A. Hamilton
Attorney.

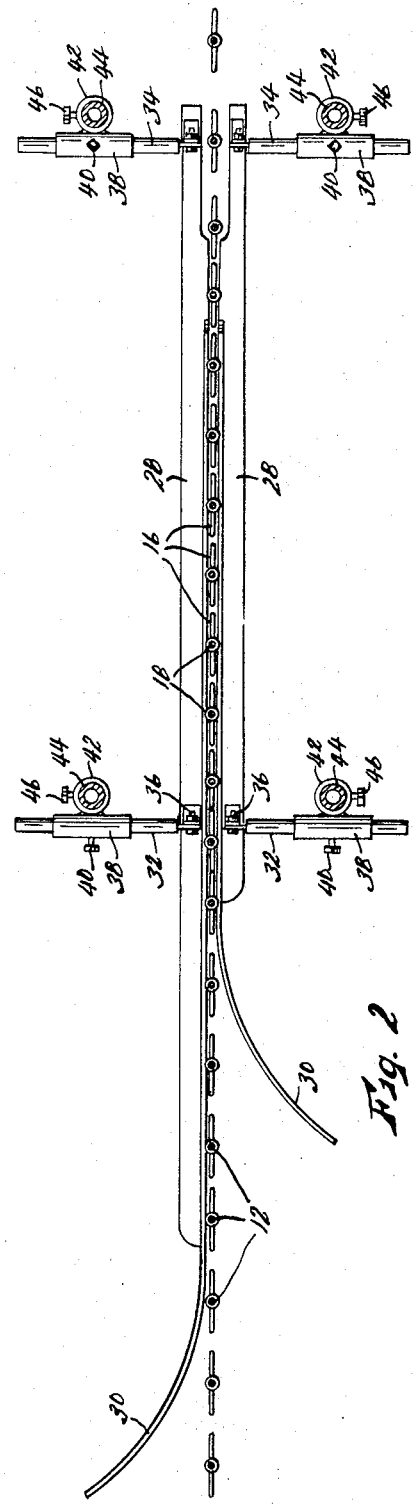

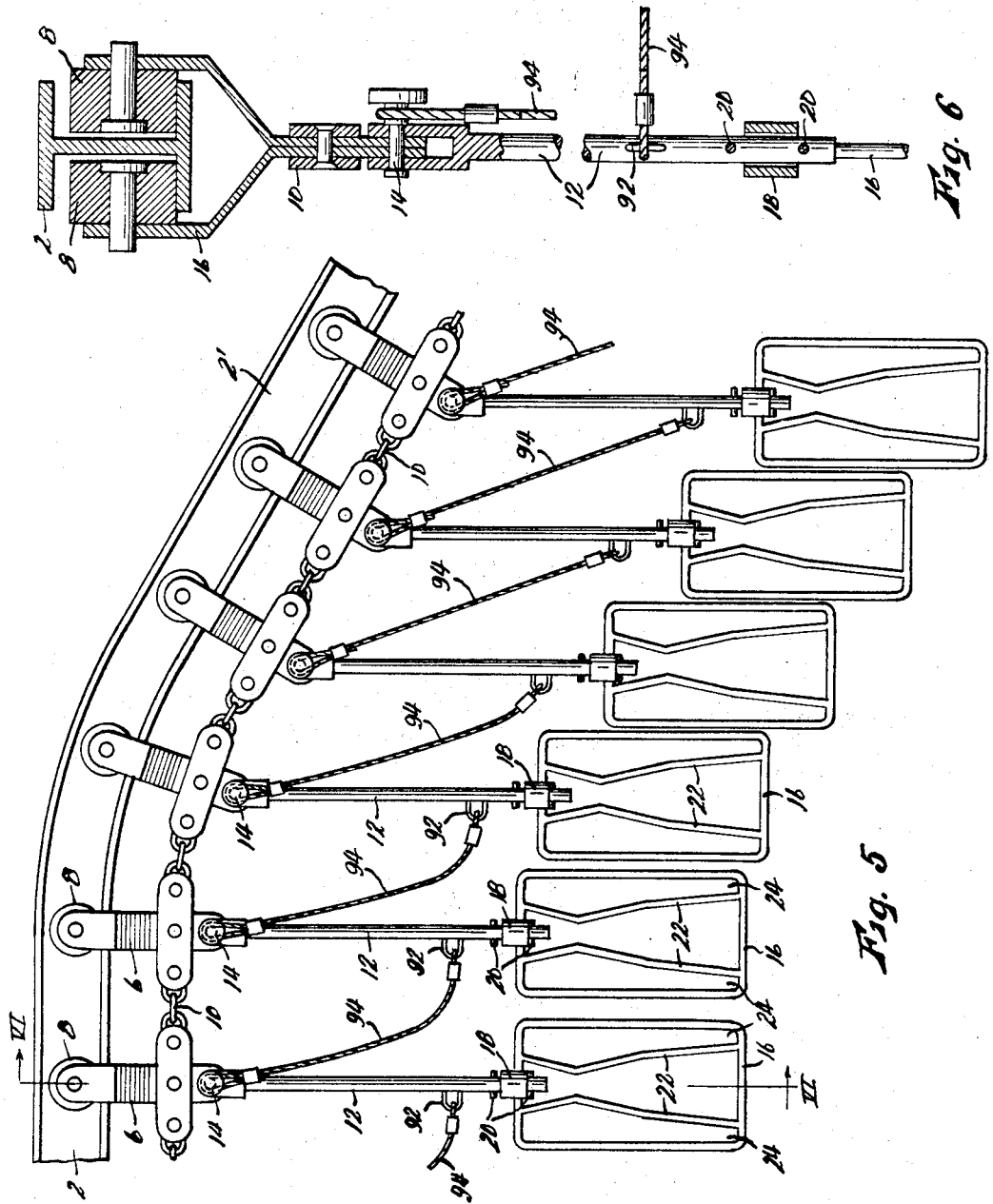

United States Patent Office

3,380,113
Patented Apr. 30, 1968

3,380,113
POULTRY SHACKLE UNLOADING DEVICE
Ralph S. Zebarth, Kansas City, Mo., and Reed J. Wight, Ogden, Utah, assignors to Ralph Zebarth, Inc., Kansas City, Mo., a corporation of Missouri
Filed Jan. 30, 1967, Ser. No. 612,679
10 Claims. (Cl. 17—11)

ABSTRACT OF THE DISCLOSURE

This disclosure is of a device for removing poultry carcasses from shackles suspended from a conveyor line by means of rigid but pivoted drop rods, each carcass being supported in a shackle by engagement of portions of said carcass in downwardly tapering notches of said shackle, and being disengageable from the shackle by elevation of said carcass portions in said notches. The unloading device includes a portion of the conveyor arranged to move said shackles in a path which is inclined downwardly in the direction of travel, and a knock-off rail disposed immediately adjacent and extending along the inclined path of shackle travel. Said knock-off rail is also inclined downwardly in the direction of shackle travel, but to a lesser degree than the shackles, so that the shackles move downwardly with respect to the rail, and the rail engages the carcasses immediately adjacent the shackles and forces them upwardly in the shackle notches to disengage them. The relative inclination of the shackle path and rail prevents the shackles from pivoting rearwardly on the conveyor, so as to continue forwardly with the drop rods substantially vertical. The degree of relative inclination of the rail and the shackle path is therefore somewhat critical.

Figure 1:
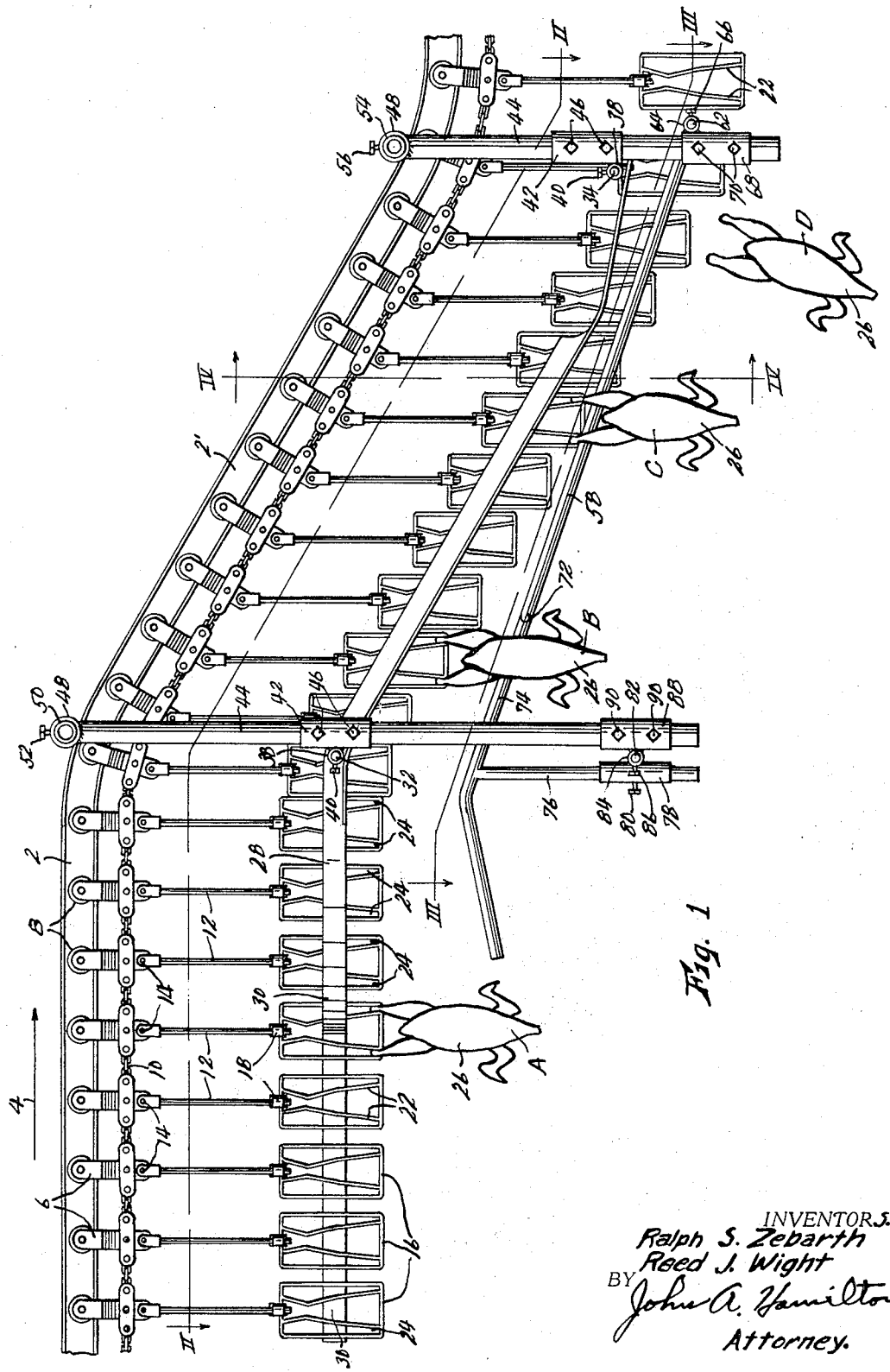

This invention relates to new and useful improvements in poultry processing equipment, and has particular reference to a device for removing poultry from shackles commonly used for supporting said poultry for movement along a conveyor line in various process steps.

In various poultry processing lines (an evisceration line has been selected for the purpose of illustrating the invention) each bird is engaged and supported by a shackle supported from the conveyor. The shackle is carried at the lower end of a drop rod or shank pivoted at its upper end to the conveyor, and is swivelled rotatably on said drop rod. The resulting freedom of movement of the bird is necessary, both for the convenience of the operators performing the evisceration or other process steps, and also for ease and convenience of inspection at various stages of the processing. However, this freedom of movement also creates problems in removing the birds from the shackles when desired. The most commonly used shackles are of a type consisting of a generally planar wire frame having elements arranged therein to form downwardly tapering V-notches adapted to receive therein various portions of the bird's anatomy, such as the feet, hocks, wings or necks, and the bird must therefore be elevated relative to the shackle to free it from the notches thereof. This lifting operation is not a simple one when, as in some cases, the "drop rod" constitutes a flexible member such as a chain, or when the drop rod is pivoted and the shackle swivelled thereon, due to the difficulty of holding the shackle firmly against rotation or horizontal movement to provide resistance as the bird is elevated from the shackle notches, while at the same time permitting the shackle to move along the conveyor line at its normal speed.

The principal objects of the present invention are, therefore, bound up in the provision of an unloading device for shackles of the type described which performs efficiently and dependably, under virtually any conceivable conditions, and entirely automatically, to disengage and drop the birds from the shackles at any desired station.

The device contemplated by the present invention operates in conjunction with a portion of the conveyor which is inclined downwardly in the direction of travel, and includes a fixed knock-off rail extending along the inclined path of shackle travel in close juxtaposition thereto, so as to engage the bird immediately adjacent the shackle. The rail is also inclined downwardly in the direction of travel, but to a lesser degree than the conveyor. Due to the relatively different inclinations, the shackle moves downwardly relative to the rail and is prevented from rising due to the rigidity of the drop rod, and the bird is forced to slide forwardly along the rail, whereby it is elevated and released from the shackle notches. Means may also be provided for limiting the forward pivoting of the shackle drop-rod to a vertical position on the inclined portion of the conveyor, so that if a bird should become tightly wedged in the notches, the shackle cannot swing forwardly to allow the bird to pass over the rail without being dislodged from the notches. Two knock-off rails may be disposed adjacent respectively at opposite sides of the shackle path, so as to function in connection with birds depending from either side of the shackle, and guide means provided for directing the shackle between said rails.

Another object is the provision of a shackle unloading device of the character described having no moving parts other than the conveyor itself, so as to obviate any problem of synchronization between the conveyor and the unloading device per se.

A further object is the provision of a shackle unloading device of the character described which will function efficiently in connection with shackles of standard and ordinary design. Various solutions to the problem have heretofore been proposed, but most of them have involved the use of special shackles, and have hence been relatively complicated and expensive.

Other objects are simplicity and economy of construction, efficiency and dependability of operation, and adaptability for use in aw ide variety of applications.

Figure 4:
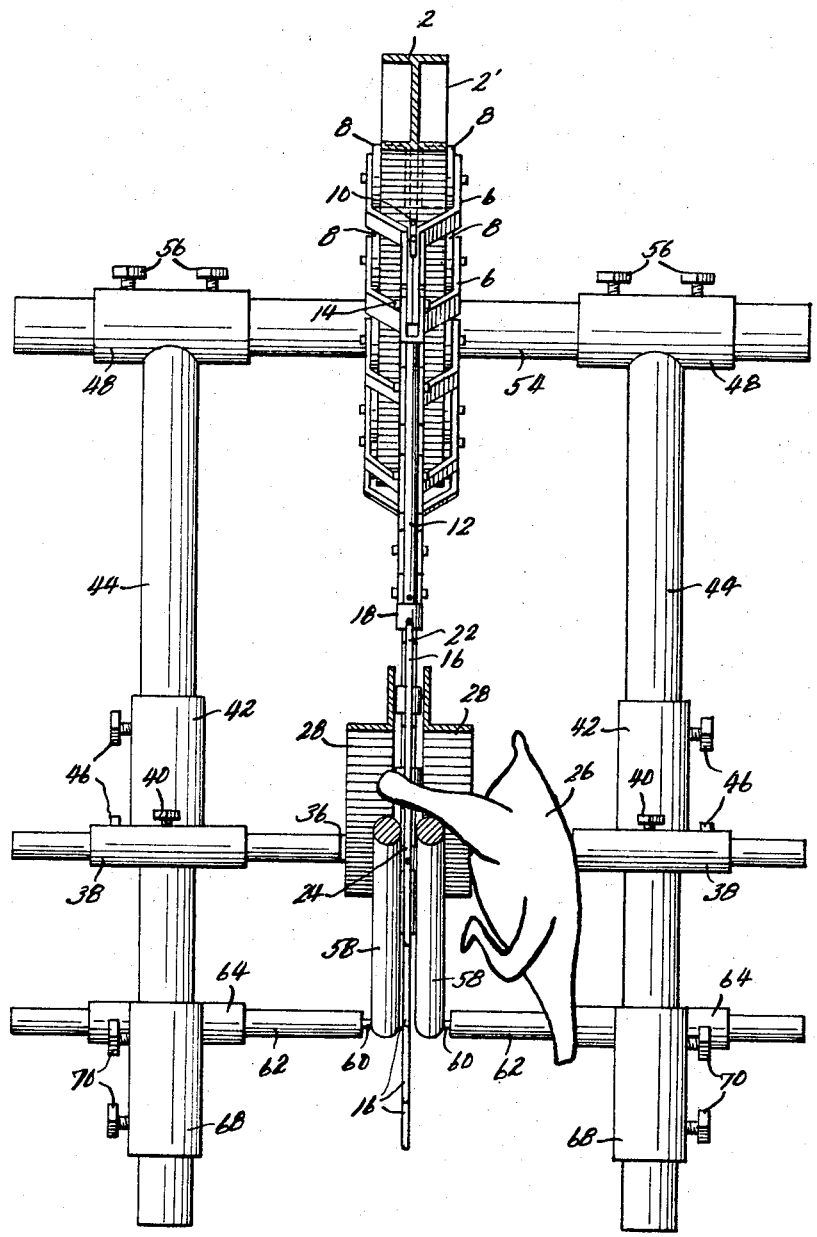

With these objects in view, as well as other objects which will appear in the course of the specification, reference will be had to the accompanying drawing, wherein:

FIG. 1 is a side elevational view of a portion of a poultry conveyor line, with a shackle unloading device embodying the present invention applied operatively thereto, with poultry carcasses engaged in certain of the shackles to illustrate the operation of the device, FIG. 2 is a sectional view taken on line II—II of FIG. 1, with the poultry carcasses omitted, FIG. 3 is a sectional view taken on line III—III of FIG. 1, with the poultry carcasses omitted, FIG. 4 is an enlarged sectional view taken on line IV—IV of FIG. 1, showing a carcass as it is being elevated in the notches of its supporting shackle, FIG. 5 is an enlarged view similar to FIG. 1, with parts omitted, showing a slightly modified construction, and FIG. 6 is an enlarged, foreshortened sectional view taken on line VI—VI of FIG. 5.

Like references numerals apply to similar parts throughout the several view, and the numeral 2 applies to a conveyor track along which poultry is conveyed in the direction of arrow 4 in FIG. 1. It comprises a steel I-beam supported fixedly by any suitable means, not shown, and while it normally extends generally horizontally for transporting poultry from one part of a processing plant to another, it is for the purposes of the present invention provided with a section $2^1$ which is inclined downwardly in the direction of poultry travel. Supported by said track are a continuous series of shackle yokes 6, each of said yokes having rotatably mounted thereon a pair of rollers 8 engaging the lower flange of said track. The axes of said rollers are horizontal and transverse to the track. Said yokes depend beneath the track, and are connected beneath said track by a flexible conveyor chain 10, said chain being parallel with and disposed beneath said track. Said chain serves to maintain the yokes in uniformly spaced apart relation along the track, and is longitudinally driven by any suitable means, not shown, whereby to move the yokes along the track, in the direction of arrow 4.

Each yoke 6 also depends beneath chain 10, and the upper end of a rigid drop rod or shank 12 is pivoted to the lower end of each yoke, as at 14, by means permitting forward and rearward swinging movement. In some installations the drop rod is universally pivoted to the yoke so as to swing freely in any direction, and this structure is also freely adapted for use with the present unloading device. Carried at the lower end of ech drop rod is a poultry shackle 16. As best shown in FIGS. 1 and 5, each shackle constitutes an open rectangle formed of heavy wire or rod stock with its major axis disposed vertically and coaxially with its drop rod 12. Said shackle has a sleeve 18 affixed to the upper end thereof, said sleeve being mounted rotatably on the lower end portion of drop rod 12 and secured thereon by a pair of pins 20 (see FIG. 5) inserted through said drop rod respectively above and below said sleeve. Welded within each shackle frame, substantially in the plane thereof, are a plurality of wires or rods 22, the arrangement of said wires or rods being subject to variation but having the general function of forming, either in conjunction with the frame or independently thereof, a plurality of downwardly tapered notches 24 into which various portions of a bird's anatomy may be inserted for suspension thereof from the shackle. Birds are commonly supported in several different ways, depending on the process steps to be performed, and on other factors. For example, they may be suspended from the shackle by their feet if said feet are still attached to the carcasses, or by the hock joints if the feet have been removed, or by their necks if the heads are still attached to the carcasses, or in some cases by their wings. In the drawing, the birds 26 are shown suspended by the hock joints. Whatever portion of the bird's anatomy is engaged, it will be seen that notches 24 of the shackles engage a reduced or "necked" portion or portions of the bird, with some enlargement (the hock joints as shown) disposed at one side of the plane of the shackle, and with the major portion of the carcass depending from the opposite side of the shackle. The bird is secured by virtue of the fact that its weight holds the engaged portion thereof in the lowermost and narrowest portions of notches 24, through which the enlargement of the carcass (i.e. hock joint) cannot pass, and can be released only by elevating the carcass relative to the shackle to a height at which notches 24 are of sufficient width to permit the passage of the hock joints therethrough.

The shackle unloading device contemplated by the present invention includes a pair of guide rails 28 extending respectively along opposite sides of and closely adjacent the path of travel of the shackles, and at an elevation intermediate the upper and lower ends of said shackles. Said guide rails extend along the shackles carried by inclined portion $2^1$ of track 2, and by the portion of track 2 approaching said inclined portion, being generally parallel to and spaced equidistantly below said track at all points. Said guide rails are curved outwardly away from each other at the ends thereof between which the shackle enter, as indicated at 30 in FIG. 2, whereby the shackles will be swivelled by rotating sleeves 18 thereof on drop rods 12 to turn them into the vertical plane of travel. The remaining portions of the guide rails between which the shackles travel are generally parallel and spaced closely to the opposite sides of the shackles, so that said shackles cannot swivel, or swing laterally, to any appreciable degree.

Each of guide rails 28 is supported by a pair of arms 34 and 36 spaced apart along the length thereof. As best shown in FIGS. 2 and 4, each of said arms is connected to the associated guide rail at 36, and extends horizontally outwardly therefrom, its outer end portion being slidable in a sleeve 38 and fixable therein by a set screw 40. Welded to each sleeve 38 is a vertical sleeve 42 which is vertically slidable on a vertical post 44 and fixable thereon by set screws 46. The upper ends of each post 44 is fixed to a horizontal sleeve 48. The sleeves 48 of the two posts 44 supporting arms 32, which are disposed substantially at the upper end of the inclined shackle path, are slidably mounted respectively on the opposite end portions of a beam 50 extending horizontally across the top of track 2, and are fixable on said beam by set screws 52. Said beams is welded or otherwise fixed to said track. Similarly, the sleeves 48 of the posts 44 carrying arms 34, which are disposed substantially at the lower end of the inclined shackle path are slidably mounted on a second transverse beam 54 fixed to track 2, and are fixable on said beam by set screws 56. By means of the adjustments provided by the mounting just described, the spacing between the guide rails may be adjusted to shackles of various thicknesses normal to their planes, the lateral spacing between posts 44 may be adjusted to permit passage of birds of different sizes therebetween, and the elevation of the guide rails may be adjusted to adapt the device for use with conveyors having drop rods 12 of different lengths.

The unloading device also includes a pair of knock-off rails 58 disposed respectively at opposite sides of the path of shackle travel, so that the slot defined therebetween lies vertically beneath the slot between guide rails 28, and also inclined downwardly in the direction of shackle travel, but to a lesser degree than track portion $2^1$. At their forward ends, substantially beneath the forward ends of the guide rails 28, each rail 58 has affixed thereto, as at 60, an outwardly extending arm 62. The outer end portions of each arm 62 is slidable in a horizontal sleeve 64, and fixable thereon by a set screw 66. A vertical sleeve 68 is welded to each sleeve 64, and each sleeve 68 is slidable on one of the forward posts 44, being fixable thereon by set screws 70. Rearwardly from their forward ends, beneath the upper portion of the inclined shackle path, the two knock-off rails 58 are joined, as at 72 (see FIG. 3) to form a single rail 74 which extends rearwardly past the upper end of the inclined shackle path. Affixed to the rearward portion of rail 74 is a depending post 76, the lower portion of which is slidable in a sleeve 78 and fixable therein by set screw 80. Sleeve 78 is welded to a horizontal transverse bar 82, the respective end portions of which are each slidable in a horizontal sleeve 84 and fixable therein by set screw 86. Each sleeve 84 has welded thereto a vertical sleeve 88, and each sleeve 88 is slidable on one of vertical posts 44 and fixable thereon by set screws 90. By means of the mounting just described, both the elevation and angle of inclination of the knock-off rails may be adjusted. The knock-off rails are preferably a smoothly polished material such as stainless steel, both to provide easy sliding movement of the birds thereagainst, and also to prevent scraping damage to the birds.

In operation, it will be seen tht FIG. 1 shows poultry carcasses 26 at various stages of the unloading operation, these successive stages being indicated by further designation of the carcasses at A, B, C and D. As the shackles are moved along the conveyor as previously described, in the direction of arrow 4, each shackle supporting a bird at position A first enters between the flared portions 30 of guide rails 28, and the shackle is thereby swivelled into the vertical plane of travel, and guided to enter between the parallel portions of the guide rails. At this time the shackles are spaced well above portion 74 of the knock-off rails, but each bird in advancing from position A will depend at one side or othe other of rail 74. As each bird advances to position B and enters the downwardly inclined portion of its path, its shackle is still well above the knock-off rails, but is then moving downwardly along a path which is more steeply inclined than said knock-off rails, so as to approach said knock-off rails gradually. At about position C of each bird, its shackle passes downwardly between knock-off rails 58, being guided to enter accurately therebetween by guide rails 28, and by the rigidity of its drop rod 12. At this time the leg or other portion of the bird immediately adjacent the shackle engages one or the other of knock-off rails 58, as shown at position C in FIG. 1, and in FIG. 4. Since the shackle and its drop rod are then hanging vertically by gravity from pivot 14, and since the knock-off rails are downwardly inclined, the portion of the bird engaging the knock-off rail is forced to slide downwardly along the knock-off rail, presuming that the inclination of the knock-off rail has been properly selected. Thus the downward movement of the bird is slowed to the rate of inclination of the knock-off rails, while the shackle continues downwardly at the greater rate of inclination of track $2^1$, so that the shackle is lowered with respect to the bird. The hock joints or other portions of the bird engaged in shackle notches 24 are thus elevated in said notches, until said engaged portions of the bird can pass through the wider upper portions of said notches and the bird falls away from the conveyor as shown at position D in FIG. 1. The falling birds may be received in suitable receptacles, not shown, or on conveyor belts for transport and further processing, or the like.

As suggested above, the inclination of knock-off rails 58 is a somewhat critical matter. If the knock-off rails were to be inclined more steeply from the horizontal, the portions of the birds engaging said knock-off rails would slide forwardly thereon too easily, with the result that it would simply pivot its shackle and drop rod 12 forwardly on pivot 14, whereupon the drop rod would simply push the shackle and bird along the knock-off rails without elevating the bird in the shackle notches. This could also occur if the bird should become tightly wedged in shackle notches 24, so as to strongly resist upward movement therein. On the other hand, if the knock-off rails should be inclined substantially less steeply so as to be more nearly horizontal, then the carcass portions engaging the knock-off rails might not slide thereon at all, but simply lodge thereagainst and their movement arrested, while the pivot 14 of the associated shackle would continue forwardly by movement of the conveyor. The shackle would then effectively be pivoted rearwardly on its pivot 14 until its drop rod 12 reached a position at right angles to rails 58. This would project the shackle downwardly between rails 58 to some degree, and hence elevate the bird somewhat in notches 24, but perhaps not sufficiently to free it from said notches. The efficiency of the action is also influenced by the relative degree of inclination of track portion $2^1$ and rails 58, since this determines the rate at which the bird will be elevated in shackle notches 24. Preliminary testing has shown that rails 58 should be inclined between 17 and 22 degrees from the horizontal, and that track portion $2^1$ should be inclined 8–13 degrees more steeply than rails 58. Thus if rails 58 are inclined at 17–22 degrees from horizontal, track portion $2^1$ should be inclined at about 30 degrees. These exact angles are exemplary only and are subject to variation, but have been found to provide good performance under a wide variety of circumstances, so long as rails 58 are smoothly polished.

FIGS. 5 and 6 show a modification of structure which largely eliminates any problems resulting from the necessity of maintaining the slope of rails 58 critically. As shown, the drop rod 12 of each shackle has an eye 92 affixed thereto adjacent its lower end. A flexible member 94 such as a cable or chain has one end thereof attached to eye 92, and its other end attached to the pivot pin 14 of the drop rod of the next following shackle. The length of said flexible member is such that it remains loose and slack as long as track 2 is horizontal, but becomes taut when the shackles enter the inclined portion $2^1$ of the track as clearly shown in FIG. 5. Thus while the drop rods can swing or pivot freely either forwardly or rearwardly while supported from horizontal portions of the track, without interference from cables 94, they cannot pivot forwardly of a vertical position when supported from inclined track portion $2^1$. Thus the shackles cannot pivot forwardly to allow the birds to slide over rails 58 without being elevated from shackle notches 24, as could occur if cables 94 were not used, and if rails 58 were inclined too steeply, or if the carcasses became wedged in said notches. Therefore, when using cables 94, rails 58 may be inclined more steeply than would otherwise be possible, whereby to positively prevent any possibility of rearward pivoting of the shackles, and to provide a positive forward bias to the carcasses and shackles by means of the rails. The cables thus render the inclination of rails 58 substantially less critical, and also tends to reduce malfunctions due to tight wedging of the birds in the shackle notches. The limitation on the forward pivotal movement of drop rods 12 could of course be performed by means other than cables 94, for example by a rigid stop affixed to the shackle yoke 6 of each drop rod. By whatever means, the allowed forward movement of each drop rod should preferably be substantially equal to the inclination of track portion $2^1$ from the horizontal.

While we have shown and described certain specific embodiments of our invention, it will be readily apparent that many minor changes of structure and operation could be made without departing from the spirit of the invention as defined by the scope of the appended claims.

What we claim as new and desire to protect by Letters Patent is:

1. In combination with a poultry conveyor including a series of drop rods each pivoted at its upper end to a moving support which is generally horizontal but which has a portion thereof inclined downwardly in the direction of travel, by means permitting forward and rearward swinging of said drop rod in the vertical plane of travel, and a generally planar shackle carried at the lower end of each of said drop rods with its plane parallel to the axis of said drop rod, and having downwardly tapering notches formed therein into which portions of a bird's anatomy may be downwardly inserted to secure said bird in said shackle, and from which shackle said bird may be disengaged by raising it upwardly in said notches, a shackle unloading device comprising:

(a) a knock-off rail extending along one side of the path of travel of said shackles beneath the inclined portion of said conveyor support in closely spaced relationship to said path, said rail also being inclined downwardly in the direction of travel but to a lesser degree than said inclined conveyor support at such a distance that each shackle, in traversing the length of said rail, is lowered from a position entirely above said rail to a position extending below said rail, whereby said rail engages a bird engaged in said shackle at a point directly adjacent said shackle and elevates said bird in said shackle notches to disengage it from said shackle.

2. The combination as recited in claim 1 with the addition of guide means carried fixedly adjacent the path of travel of said shackles beneath the inclined portion of said conveyor support and engaging said shackles to prevent swinging thereof laterally to the vertical path of travel, whereby to maintain said shackles in proper relation to said rail as each shackle is lowered to extend beneath said rail.

3. The combination as recited in claim 1 wherein each of said shackles is swivelled on its associated drop rod for rotation about the axis of said drop rod, and with the addition of guide means carried fixedly adjacent the vertical path of travel of said shackles and operable to engage and swivel said shackles into the vertical plane of travel before they approach said knock-off rail.

4. The combination as recited in claim 1 wherein each of said shackles is swivelled on its associated drop rod for rotation about the axis of said drop rod, and with the addition of guide means carried fixedly adjacent the vertical path of travel of said shackles and operable to engage and swivel said shackles into the vertical plane of travel before they approach said knock-off rail, and to prevent swinging of said shackles laterally to the vertical plane of travel as they traverse the length of said knock-off rail.

5. The combination as recited in claim 1 including a pair of said knock-off rails disposed respectively at opposite sides of the path of shackle travel, said rails being substantially parallel and spaced apart sufficiently that said shackles may pass downwardly therebetween.

6. The combination as recited in claim 1 with the addition of means for adjusting the angle of inclination of said knock-off rail.

7. The combination as recited in claim 1 with the addition of means for adjusting the relative angles of inclination of said inclined track portion and said knock-off rail.

8. The combination as recited in claim 1 wherein said knock-off rail is inclined at approximately 17–22 degrees from horizontal.

9. The combination as recited in claim 1 wherein said knock-off rail is inclined at approximately 17–22 degrees from horizontal, and wherein said inclined track portion is sloped at approximately 30 degree from horizontal.

10. The combination as recited in claim 1 with the addition of means for limiting the forward pivotal movement of each of said drop rods, relative to its support, to a degree substantially equal to the angle of said inclined conveyor support portion from horizontal.

References Cited
UNITED STATES PATENTS 3,097,391　7/1963　Wayne _____ 17—11

RICHARD E. AEGERTER, *Primary Examiner.*